US012674967B1

(12) United States Patent
Ning

(10) Patent No.: US 12,674,967 B1
(45) Date of Patent: Jul. 7, 2026

(54) COMPACT WIDE-ANGLE LENS

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 219 days.

(21) Appl. No.: 18/678,161

(22) Filed: May 30, 2024

Related U.S. Application Data

(60) Provisional application No. 63/505,396, filed on May 31, 2023.

(51) Int. Cl.
| | |
|---|---|
| *G02B 13/18* | (2006.01) |
| *G02B 9/12* | (2006.01) |
| *G02B 13/06* | (2006.01) |

(52) U.S. Cl.
CPC .............. *G02B 13/18* (2013.01); *G02B 9/12* (2013.01); *G02B 13/06* (2013.01)

(58) Field of Classification Search
CPC ................ G02B 9/12–32; G02B 13/04; G02B 15/143–143507
See application file for complete search history.

(56) References Cited

U.S. PATENT DOCUMENTS

| | | | |
|---|---|---|---|
| 3,737,214 A | 6/1973 | Shimizu | |
| 7,023,628 B1 | 4/2006 | Ning | |
| 7,161,746 B2 | 1/2007 | Mizuguchi | |
| 2017/0184814 A1* | 6/2017 | Ning .................. | G02B 13/0045 |
| 2019/0056572 A1* | 2/2019 | Takada .................. | H04N 23/69 |
| 2022/0121017 A1* | 4/2022 | Saotome ................. | G02B 9/60 |

FOREIGN PATENT DOCUMENTS

JP          2017-068114 A          6/2017

* cited by examiner

*Primary Examiner* — Lauren Nguyen
(74) *Attorney, Agent, or Firm* — Mark Wisnosky

(57) ABSTRACT

An object of the present invention is to create a wide-angle lens that is compact, having a lower front diameter to image circle ratio. Such a lens can be used in space constrained applications such as endoscopy or other applications requiring a wide field of view and a compact design. The lens design includes three lens groups and are scalable. The designs are further characterized by a set of parametric equations defining relationships between ratios of focal lengths for the lens groups and lens elements within the groups. This design can be scaled to a smaller absolute size for space constrained applications, or enlarged to cover an even large image circle.

13 Claims, 5 Drawing Sheets

100

COMPACT WIDE-ANGLE LENS

CROSS REFERENCE TO RELATED APPLICATIONS

This application claims priority to U.S. Provisional application 63/505,396, titled RGBIR IMAGING LENSES, filed May 31, 2023, including a common inventor.

STATEMENT REGARDING FEDERALLY SPONSORED RESEARCH OR DEVELOPMENT

Not Applicable.

BACKGROUND OF THE INVENTION

Technical Field

The invention relates to wide-angle lens systems having a small form factor as indicated by the ratio of the clear aperture of the first or front lens to the diameter of the image circle.

1 RELATED BACKGROUND ART

Wide-angle lenses having field of view >90 deg are useful for a variety of applications including security cameras and automotive cameras. The front lens diameters are typically large relative to the image circle (size). For example, the miniature fisheye lenses disclosed in U.S. Pat. No. 7,023,628 have ratios of front element diameter to the image circle about 2.9× at an angular FOV of 195 deg. When the FOV is further increased to over 200 degrees the ratio of the front element diameter to the image circle will further increase resulting in a lens with large front element. Another example of such a lens is the Nikon 6 mm F/2.8 fisheye U.S. Pat. No. 3,737,214 where the ratio of front element diameter to the image circle is much greater than 2.9×. Other examples include JP2017-068114A, and U.S. Pat. No. 7,161,746B2.

An objective of this invention is to provide wide-angle lenses with improved image quality in a small form factor where the ratio of the clear aperture of the front or first lens element to the image circle is reduced from prior art and conventional lenses.

2 BRIEF SUMMARY OF THE INVENTION

The invented wide-angle lenses of the present invention comprise three lens groups. A lens group has a minimum of one lens element with non-trivial optical function. Each lens element has two surfaces. The object surface of an element is defined as the surface facing the object space of the lens assembly. In all drawings the object space is on the left side of the lens assembly. The image surface is defined as the lens surface facing the image space of the lens assembly. In all drawings the image space is on the right side of the lens assembly. The three lens groups comprise:

1) A first group (counting from the object side) having a negative refractive power comprises two or more elements. The effective focal length of this group is f1. The first element is a negative powered element having a concave image surface. The second element has a meniscus shape with a concave object surface. In preferred embodiments the second element in this group is an aspheric element. An aspheric element defined as lens element having at least one aspheric surface, which is generally described by the following well-known equation:

$$z = \frac{cr^2}{1 + \sqrt{1 - (1 + k)c^2 r^2}} + a_1 r^2 +$$

$$a_2 r^4 + a_3 r^6 + a_4 r^8 + a_5 r^{10} + a_6 r^{12} + a_7 r^{14} + a_8 r^{16}.$$

Refer to Zemax manual (www.zemax.com) for a detailed explanation of terms used in this equation (Zemax is a registered trademark of Zemax, LLC).

2) A second group having a positive power comprising a positive element and a positively powered cemented doublet. The effective focal length of this group is f2. A cemented doublet is a two-element lens assembly where a positively powered element is cemented to a negatively powered element with suitable optical cement. The effective focal length of the doublet is fd. In preferred embodiments, the negative element of the cemented doublet faces the object side where the positive element of the doublet faces the image side. The positive elements in this group have negative dn/dT values, where n is the refractive index of the lens material at d-line and T is the temperature.

3) A third group comprising an aspherical element with negative power. The effective focal length is f3. Optionally, the aspherical surfaces are complex profiles with inflections points.

The effective focal length of the entire lens assembly is f0. The following conditions are satisfied between the lens groups:

$$f1/f0 = < -1.5 \tag{1}$$
$$1.2 = < f2/f0 = < 1.8 \tag{2}$$
$$f3/f0 = < -3.0 \tag{3}$$
$$1.5 = < fd/f2 = < 3.5 \tag{4}$$
$$2.2 = < fd/f0 = < 5.5 \tag{5}$$

The lenses of present invention are of small form factor while achieving field of view equal or greater than 90 degrees. Specifically, the following conditions are satisfied:

$$D1/1C = < 1.5 \tag{6}$$

Where D1 is the clear aperture diameter of the object surface of the first element in group 1 at a given field angle, and IC the image circle diameter of the lens assembly at the same given field angle. When condition (6) is satisfied the lens assembly has a small form factor where the front element clear aperture is less than 1.5× the size of image circle.

Figure 3:
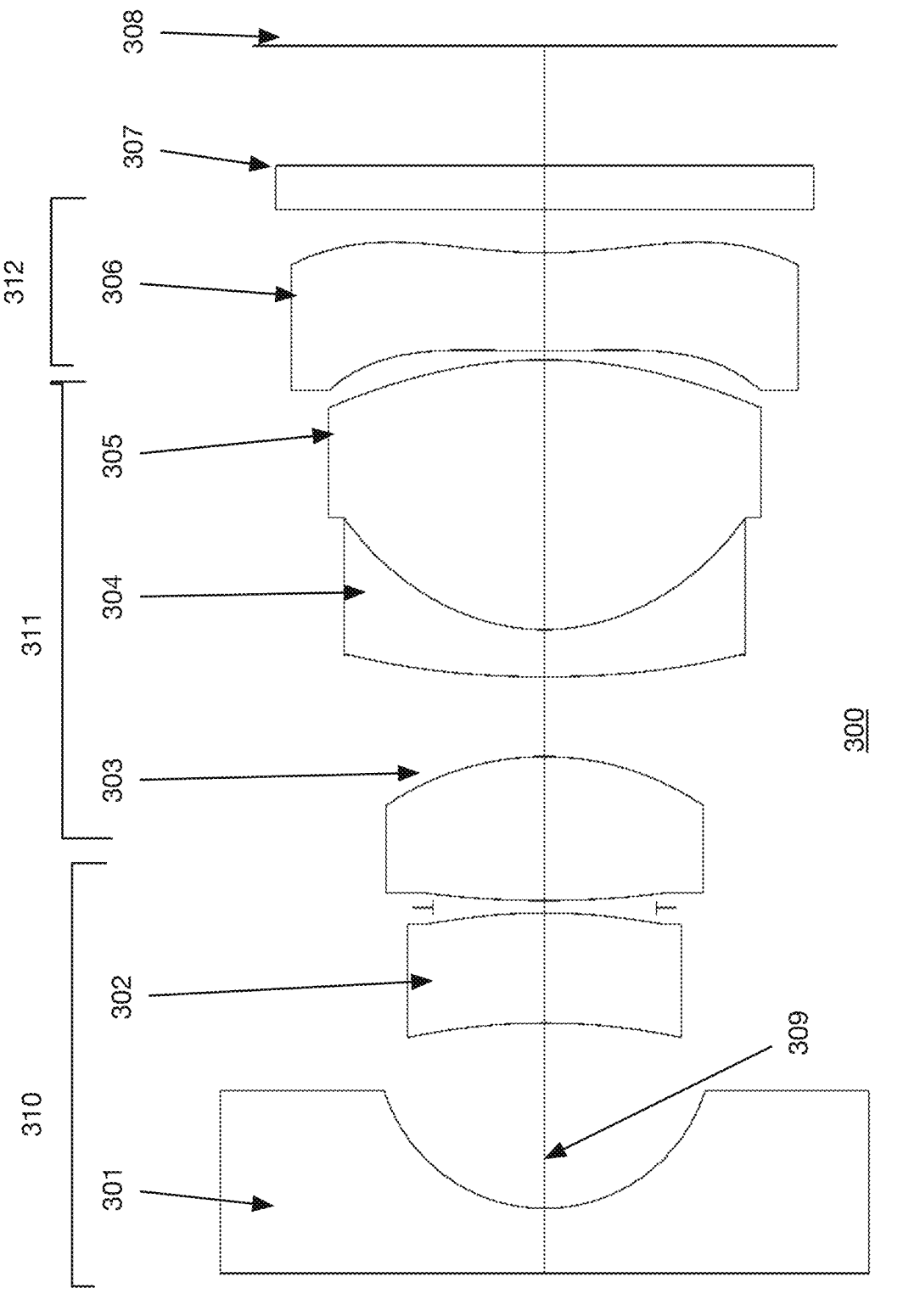

FIG. 3 shows a third embodiment of the invented Compact Wide-angle lens having a field angle of +/−86 degrees, a relative aperture of F/2.2 and using a complex aspherical lens element in Group 3.

Figure 4:
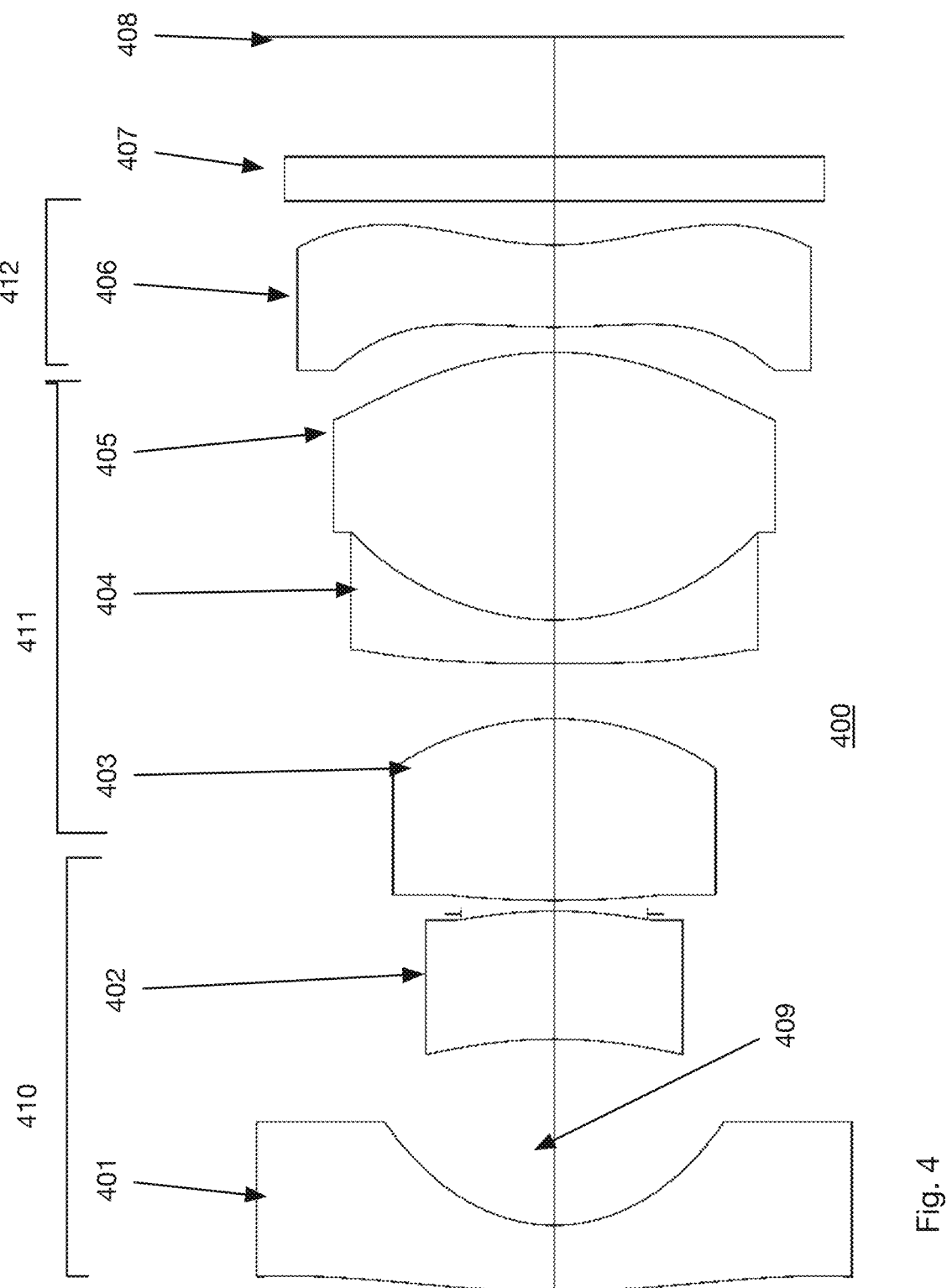

FIG. 4 shows a fourth embodiment of the invented Compact Wide-angle lens having a field angle of +/−86 degrees, a relative aperture of F/2.4, the two lens elements in the first group are aspherical and using a complex aspherical lens element in Group 3.

Figure 5:
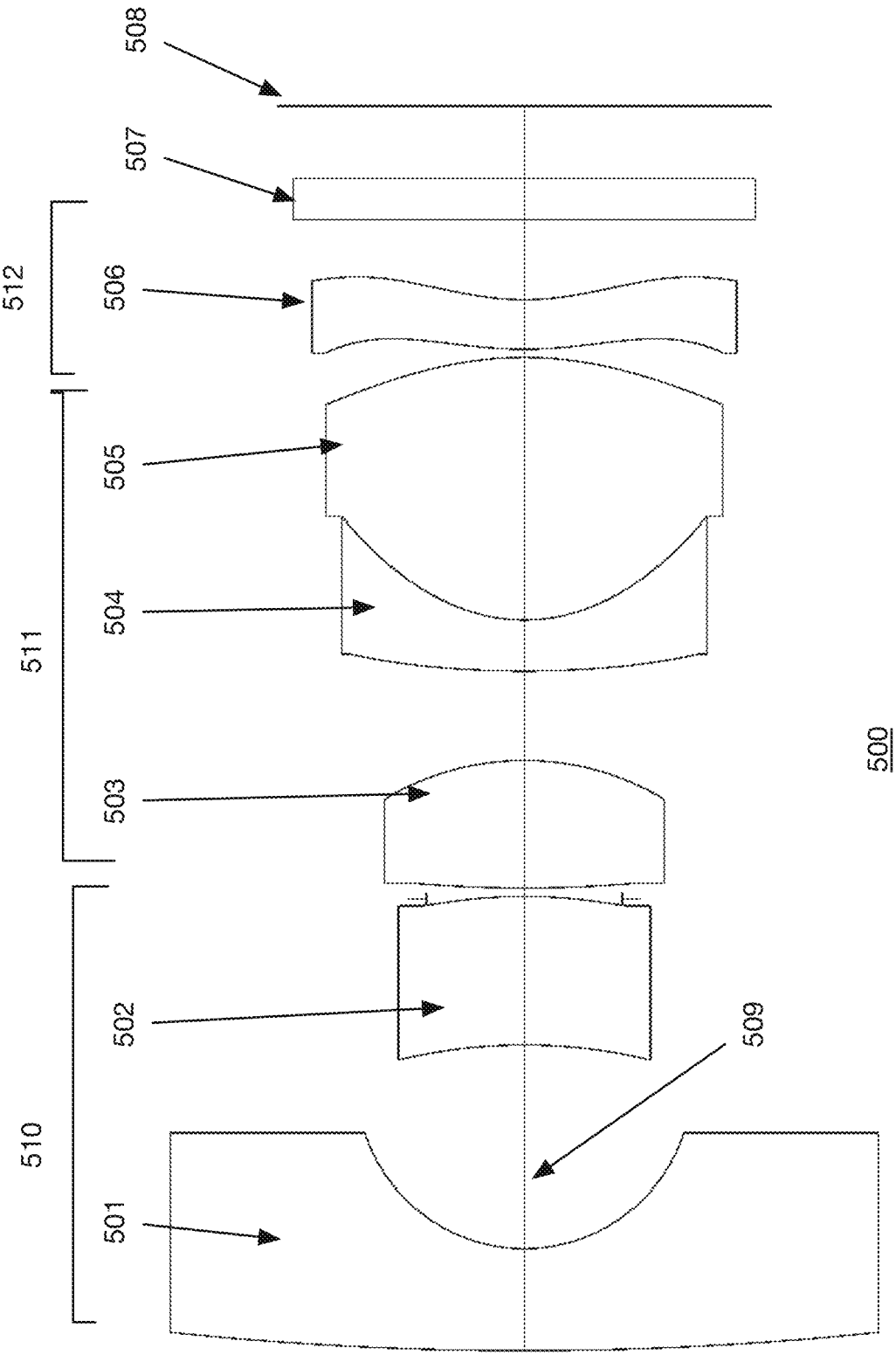

FIG. 5 shows a fifth embodiment of the invented Compact Wide-angle lens having a field angle of +/−88 degrees, a relative aperture of F/2.2 and using a complex aspherical lens element in Group 3.

3 DETAILED DESCRIPTION OF THE INVENTION

3.1 Embodiment 1

Figure 1:
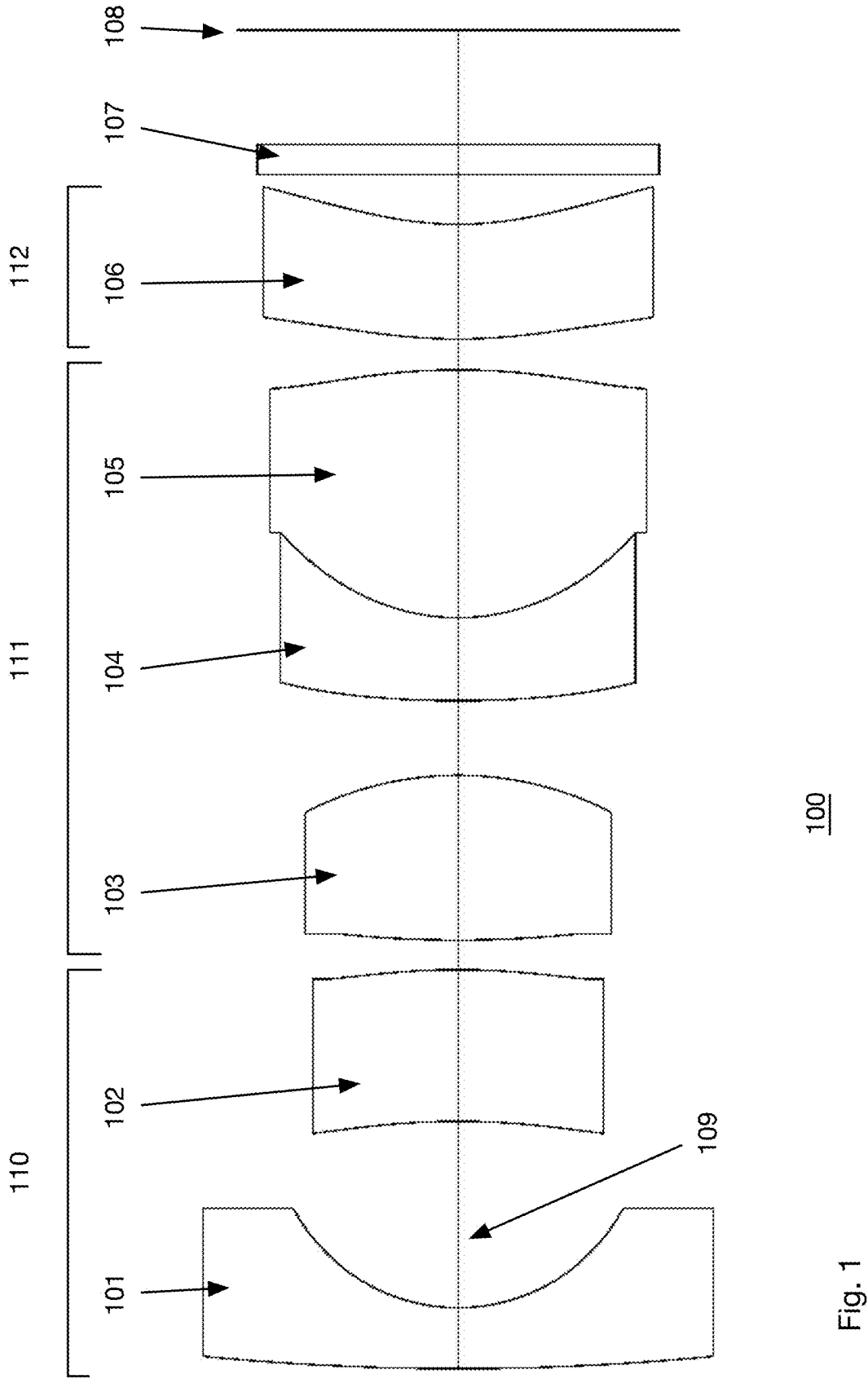
FIG. 1 shows a first embodiment of the invented Compact Wide-angle Lens having a field angle +/−45 degrees and a relative aperture (f/#) of f/2.8.

FIG. 1 illustrates a first embodiment of present invention. This design has a field angle of up to +/−45° with a relative aperture of F/2.8. Table 1A shows the prescription of this embodiment and Table 1B shows the aspherical coefficients for aspherical surface:

TABLE 1A shows the prescription of this embodiment 1.

| Surf | Type | Radius | Thickness | Nd | Vd | Conic | Comment |
|---|---|---|---|---|---|---|---|
| OBJ | STANDARD | Infinity | Infinity | | | 0 | |
| 1 | STANDARD | 43.97875 | 0.9998302 | 1.456498, | 90.47088 | 0 | L1, 101 |
| 2 | STANDARD | 3.08173 | 3.064114 | | | 0 | |
| 3 | EVENASPH | −12.3987 | 2.493347 | 1.634086, | 23.1777 | 0 | L2, 102 |
| 4 | EVENASPH | −11.0328 | 0.4858577 | | | 0 | |
| STO | STANDARD | 19.05046 | 2.709181 | 1.592800, | 68.3459 | 0 | L3, 103 |
| 6 | STANDARD | −5.54487 | 1.226372 | | | 0 | |
| 7 | EVENASPH | 18.54943 | 1.363663 | 1.634086, | 23.1777 | 0 | L4, 104 |
| 8 | STANDARD | 3.499651 | 4.075564 | 1.536497, | 55.98069 | −0.378464 | L5, 105 |
| 9 | EVENASPH | −10.371 | 0.5053372 | | | 0 | |
| 10 | EVENASPH | 8.62692 | 1.886065 | 1.634086, | 23.1777 | 0 | L6, 106 |
| 11 | EVENASPH | 5.52849 | 0.81625 | | | 0 | |
| 12 | STANDARD | Infinity | 0.5 | 1.516797, | 64.21235 | 0 | Filter, 107 |
| 13 | STANDARD | Infinity | 1.876691 | | | 0 | |
| IMA | STANDARD | Infinity | | | | 0 | 108 |

TABLE 1b

Aspherical surface coefficients of Embodiment 1

Surface 3 EVENASPH L2, 202

| Coefficient on r^ 2 : | 0 |
|---|---|
| Coefficient on r^ 4 : | 0.000552 |
| Coefficient on r^ 6 : | 8.75E−05 |
| Coefficient on r^ 8 : | 0 |
| Coefficient on r^ 10 : | 0 |
| Coefficient on r^ 12 : | 0 |
| Coefficient on r^ 14 : | 0 |
| Coefficient on r^ 16 : | 0 |

Surface 4 EVENASPH

| Coefficient on r^ 2 : | 0 |
|---|---|
| Coefficient on r^ 4 : | 0.002245 |
| Coefficient on r^ 6 : | 8.15E−05 |
| Coefficient on r^ 8 : | 0 |
| Coefficient on r^ 10 : | 0 |
| Coefficient on r^ 12 : | 0 |
| Coefficient on r^ 14 : | 0 |
| Coefficient on r^ 16 : | 0 |

TABLE 1b-continued

Aspherical surface coefficients of Embodiment 1

Surface STO STANDARD L3, 103
Surface 6 STANDARD
Surface 7 EVENASPH L4, 104

| Coefficient on r^ 2 : | 0 |
|---|---|
| Coefficient on r^ 4 : | 0.00092 |
| Coefficient on r^ 6 : | 0 |
| Coefficient on r^ 8 : | 0 |
| Coefficient on r^10 : | 0 |
| Coefficient on r^12 : | 0 |
| Coefficient on r^14 : | 0 |
| Coefficient on r^16 : | 0 |

Surface 8 STANDARD L5, 105
Surface 9 EVENASPH

| Coefficient on r^ 2 : | 0 |
|---|---|
| Coefficient on r^ 4 : | 0.00071 |
| Coefficient on r^ 6 : | 0.000112 |
| Coefficient on r^ 8 : | 0 |
| Coefficient on r^ 10 : | 0 |
| Coefficient on r^ 12 : | 0 |
| Coefficient on r^ 14 : | 0 |
| Coefficient on r^ 16 : | 0 |

TABLE 1b-continued

Aspherical surface coefficients of Embodiment 1

Surface 10 EVENASPH L6, 106

| Coefficient on r^ 2 : | 0 |
|---|---|
| Coefficient on r^ 4 : | −0.00365 |
| Coefficient on r^ 6 : | 0.000115 |
| Coefficient on r^ 8 : | 0 |
| Coefficient on r^ 10 : | 0 |
| Coefficient on r^ 12 : | 0 |
| Coefficient on r^ 14 : | 0 |
| Coefficient on r^ 16 : | 0 |

Surface 11 EVENASPH

| Coefficient on r^ 2 : | 0 |
|---|---|
| Coefficient on r^ 4 : | −0.00495 |
| Coefficient on r^ 6 : | 0.000113 |
| Coefficient on r^ 8 : | −6.91E−07 |
| Coefficient on r^ 10 : | 0 |
| Coefficient on r^ 12 : | 0 |
| Coefficient on r^ 14 : | 0 |
| Coefficient on r^ 16 : | 0 |

In this and all subsequent lens prescriptions, The surfaces are numbered left to right in FIG. 1, from object to image. The object surface (OBJ) is a plane. Radius refers to radius of curvature of the surface. An infinite radius of curvature is a plane. Type refers to either a spherical surface (STAN-DARD) or an aspherical surface (EVANASPH). The aspherical coefficients, as already described above, are included in Table 1b. Nd refers to the index of refraction at the d line and Vd is the abbe number.

The lens 100 is constructed as described in the brief summary above and comprises, from objective towards image or from left to right in FIG. 1, three lens groups, Group 1, Group 2 and Group 3 all aligned along the optical axis 109. Group 1, 110 has negative refractive power and comprises, a first negative power lens element, L1, 101 having a concave image surface and a second meniscus shaped lens element, L2, 102 with a concave object surface and where L2 is aspherical, both L2 surfaces are aspherical. The effective focal length of Group 1, 110 is f1. Group 2, 111 has positive power, an effective focal length, f2, and, comprises positive powered L3, 103 and a positive powered cemented doublet L4, 104 and L5, 105 where L4, 104 is a negatively powered element, on the object side of the doublet and L5, is a positive powered element on the image side of the doublet. The effective focal length of the doublet is fd. The dn/dT values of the positive powered elements of Group 2, L3, 103 and L5, 105, are both negative. Group 3 comprises L6, 106, an aspherical element. The effective focal length is f3. The flat filter 107 is an optional element.

The effective focal length of the entire lens assembly is f0. The values for the lens design parameters for this and all subsequent embodiments are included in table 6. Parameters include: the diameter of the image circle, IC, the clear aperture of the first lens, D1, and, the values for f0, f1, f2, f3 and fd. Calculated values showing that Conditions 1-6 are satisfied as shown in Table 7 below.

3.2 Embodiment 2

Figure 2:
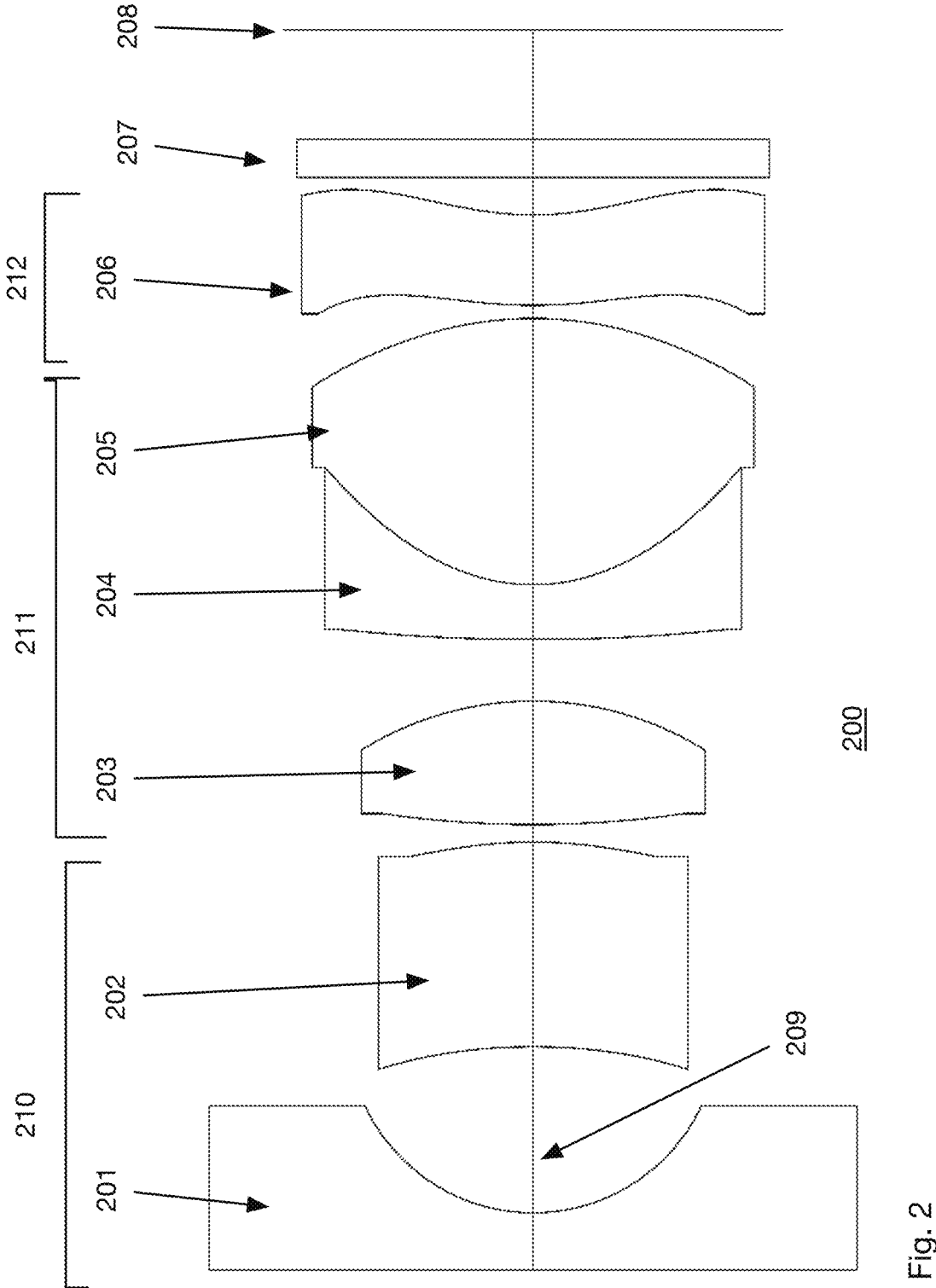
FIG. 2 shows a second embodiment of the invented Compact Wide-angle lens having a field angle of +/−86 degrees, a relative aperture of F/2.2 and using a complex aspherical lens element in Group 3.

FIG. 2 illustrates a second embodiment of the present invention. This design has a field angle of +/−86° with a relative aperture of F/2.2. Table 2A shows the optical prescription of Example 2. Table 2B shows the aspherical surface coefficients of this second embodiment.

TABLE 2B shows the aspheric coefficients for the optical prescription of Example 2.

| Surface 4 EVENASPH L2, 202 | |
| --- | --- |
| Coefficient on r^2 : | 0 |
| Coefficient on r^4 : | −0.002475855 |
| Coefficient on r^6 : | 0.000163831 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |
| Surface STO EVENASPH | |
| Coefficient on r^2 : | 0 |
| Coefficient on r^4 : | 0.004223131 |
| Coefficient on r^6 : | 0.00037288 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |
| Surface 8 EVENASPH, L4, 204 | |
| Coefficient on r^2 : | 0 |
| Coefficient on r^4 : | 0.001391169 |
| Coefficient on r^6 : | −0.000120858 |
| Coefficient on r^8 : | −3.51E−06 |
| Coefficient on r^10 : | 0 |
| Coefficient on r^12 : | 0 |
| Coefficient on r^14 : | 0 |
| Coefficient on r^16 : | 0 |
| Surface 10 EVENASPH | |
| Coefficient on r^2 : | 0 |
| Coefficient on r^4 : | −0.000245971 |
| Coefficient on r^6 : | 0.000422076 |
| Coefficient on r^8 : | −3.11E−05 |
| Coefficient on r^10 : | 0 |
| Coefficient on r^12 : | 0 |
| Coefficient on r^14 : | 0 |
| Coefficient on r^16 : | 0 |

TABLE 2A shows the optical prescription of Example 2.

| Surf | Type | Radius | Thickness | Nd | Vd | Conic | Comment |
| --- | --- | --- | --- | --- | --- | --- | --- |
| OBJ | STANDARD | Infinity | Infinity | | | | |
| 2 | STANDARD | Infinity | 0.7107765 | 1.496998, | 81.594687 | 0 | L1, 201 |
| 3 | STANDARD | 2.326901 | 2.067821 | | | 0 | |
| 4 | EVENASPH | −7.441064 | 2.54835 | 1.634086, | 23.177698 | 0 | L2, 202 |
| STO | EVENASPH | −5.751266 | 0.2185 | | | 0 | |
| 6 | STANDARD | 13.07275 | 1.53735 | 1.592824, | 68.624378 | 0 | L3, 203 |
| 7 | STANDARD | −4.07746 | 0.7685 | | | 0 | |
| 8 | EVENASPH | 28.56112 | 0.6804513 | 1.634086, | 23.177698 | 0 | L4, 204 |
| 9 | STANDARD | 2.391581 | 3.314497 | 1.536497, | 55.980688 | −0.8985313 | L5, 205 |
| 10 | EVENASPH | −4.604154 | 0.1647 | | | 0 | |
| 11 | EVENASPH | 5.840158 | 1.124511 | 1.634086, | 23.177698 | 0 | L6, 206 |
| 12 | EVENASPH | 3.746398 | 0.4672647 | | | 0 | |
| 13 | STANDARD | Infinity | 0.4742125 | 1.516797, | 64.212351 | 0 | Filter, 207 |
| 14 | STANDARD | Infinity | 1.361274 | | | | |
| IMA | STANDARD | Infinity | | | | | 208 |

TABLE 2B-continued shows the aspheric coefficients for the
optical prescription of Example 2.

Surface 11 EVANASPH L6,
206

| | |
|---|---|
| Coefficient on r^2 : | 0 |
| Coefficient on r^4 : | −0.015685364 |
| Coefficient on r^6 : | 0.000294196 |
| Coefficient on r^8 : | −2.09E−05 |
| Coefficient on r^10 : | 0 |
| Coefficient on r^12 : | 0 |
| Coefficient on r^14 : | 0 |
| Coefficient on r^16 : | 0 |

Surface 12 EVANASPH

| | |
|---|---|
| Coefficient on r^2 : | 0 |
| Coefficient on r^4 : | −0.01891182 | aspherical surfaces of L6, 206, in this preferred embodiment, are complex profiles with inflections points. The effective focal length of Group 3, 212 is f3. The flat filter 207 is an optional element.

The effective focal length of the entire lens assembly is f0. The values for the lens design parameters are included in table 6 below. Parameters include: the diameter of the image circle, IC, the clear aperture of the first lens, D1, and, the values for f0, f1, f2, f3 and fd. Calculated values showing that Conditions 1-6 are satisfied as shown in Table 7 below.

3.3 Embodiment 3

FIG. 3 illustrates a third embodiment. This design has a field angle of +/−86° with a relative aperture of F/2.2. Table 3A shows the optical prescription of Example 3. Table 3.3B shows the Aspheric coefficients of Example 3.

TABLE 3A shows the optical prescription of Example 3.

| Surf | Type | Radius | Thickness | Nd | Vd | Conic | Comment |
|---|---|---|---|---|---|---|---|
| OBJ | STANDARD | Infinity | Infinity | | | | |
| 1 | STANDARD | Infinity | 0.7495393 | 1.496998, | 81.594687 | 0 | L1, 301 |
| 2 | STANDARD | 1.945331 | 2.132183 | | | 0 | |
| 3 | EVENASPH | −7.727977 | 1.268231 | 1.634086, | 23.177698 | 0 | L2, 302 |
| 4 | EVENASPH | −6.195947 | 0.05942069 | | | 0 | |
| STO | STANDARD | Infinity | 0.08127906 | | | 0 | |
| 6 | STANDARD | 11.15766 | 1.655449 | 1.569070, | 71.306648 | 0 | L3, 303 |
| 7 | STANDARD | −3.259682 | 0.9173111 | | | 0 | |
| 8 | EVENASPH | 11.40435 | 0.5438281 | 1.634086, | 23.177698 | 0 | L4, 304 |
| 9 | EVENASPH | 2.441461 | 3.104214 | 1.536497, | 55.980688 | −0.3250401 | L5, 305 |
| 10 | EVENASPH | −5.29392 | 0.1012623 | | | 0 | |
| 11 | EVENASPH | 22.67589 | 1.129654 | 1.634086, | 23.177698 | 0 | L6, 306 |
| 12 | EVENASPH | 6.11309 | 0.5 | | | 0 | |
| 13 | STANDARD | Infinity | 0.5 | 1.516797, | 64.212351 | 0 | |
| 14 | STANDARD | Infinity | 1.381951 | | | | |
| IMA | STANDARD | Infinity | | | | | 308 |

TABLE 2B-continued shows the aspheric coefficients for the
optical prescription of Example 2.

| | |
|---|---|
| Coefficient on r^6 : | 0.00041898 |
| Coefficient on r^8 : | −9.55E−06 |
| Coefficient on r^10 : | 0 |
| Coefficient on r^12 : | 0 |
| Coefficient on r^14 : | 0 |
| Coefficient on r^16 : | 0 |

The lens 200 is constructed as described in the brief summary above and comprises, from objective towards image or from left to right in FIG. 2, three lens groups, Group 1, 210, Group 2, 211 and Group 3, 212 all aligned along the optical axis 209. Group 1, 210 has negative refractive power and comprises negative power lens element L1, 201, having a concave image surface and meniscus shaped lens element L2, 202 where L2 is aspherical. Both surfaces of L2 are aspherical. The effective focal length of Group 1, 210 is f1, shown in table 5 below. Group 2, 211 has positive power and comprises positive powered L3, 203 and a cemented doublet L4, 204 and L5, 205 where L4 is a negatively powered element on the object side of the cemented doublet, and L5, is a positive powered element on the image side of the doublet. The effective focal length of the doublet is fd. The dn/dT values of the positive powered elements of Group 2, L3, 203 and L5, 205, are both negative. Group 3 comprises L6, 206, an aspherical element. The

TABLE 3B shows the Aspheric coefficients of Example 3.

Surface 3, L2, 302

| | |
|---|---|
| Coefficient on r^2 : | 0 |
| Coefficient on r^4 : | −0.00267 |
| Coefficient on r^6 : | 0.000861 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |

Surface 4 EVENASPH

| | |
|---|---|
| Coefficient on r^2 : | 0 |
| Coefficient on r^4 : | 0.004646 |
| Coefficient on r^6 : | 0.001147 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |

Surface 8 EVENASPH
L4, 304

| | |
|---|---|
| Coefficient on r^2 : | 0 |
| Coefficient on r^4 : | 0.001135 |
| Coefficient on r^6 : | 0 |
| Coefficient on r^8 : | 0 |

TABLE 3B-continued shows the Aspheric coefficients of Example 3.

| Coefficient on r^10 : | 0 |
|---|---|
| Coefficient on r^12 : | 0 |
| Coefficient on r^14 : | 0 |
| Coefficient on r^16 : | 0 |

Surface 9 EVENASPH
L5, 305

| Coefficient on r^2 : | 0 |
|---|---|
| Coefficient on r^4 : | −0.0022 |
| Coefficient on r^6 : | 0 |
| Coefficient on r^8 : | 0 |
| Coefficient on r^10 : | 0 |
| Coefficient on r^12 : | 0 |
| Coefficient on r^14 : | 10 |
| Coefficient on r^16 : | 0 |

Surface 10 EVENASPH

| Coefficient on r^2 : | 0 |
|---|---|
| Coefficient on r^4 : | 0.001852 |
| Coefficient on r^6 : | 0 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |

Surface 11 EVENASPH
L6, 306

| Coefficient on r^2 : | 0 |
|---|---|
| Coefficient on r^4 : | −0.01437 |
| Coefficient on r^6 : | −0.00015 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |

Surface 12 EVENASPH

| Coefficient on r^2 : | 0 |
|---|---|
| Coefficient on r^4 : | −0.01559 |
| Coefficient on r^6 : | 0.00041 |
| Coefficient on r^8 : | 0 |
| Coefficient on r^10 : | 0 |
| Coefficient on r^12 : | 0 |

TABLE 3B-continued shows the Aspheric coefficients of Example 3.

| Coefficient on r^14 : | 0 |
|---|---|
| Coefficient on r^16 : | 0 |

The lens 300 is constructed as described in the brief summary above and comprises, from objective towards image or from left to right in FIG. 3, three lens groups, Group 1, 310, Group 2, 311 and Group 3, 312 all aligned along the optical axis 309. Group 1, 310 has negative refractive power and comprises negative power lens element L1, 301, having a concave image surface and meniscus shaped lens element L2, 302 where L2 is aspherical. Both surfaces of L2 are aspherical. The effective focal length of Group 1, 310 is f1, shown in table 5 below. Group 2, 311 has positive power and comprises positive powered L3, 303 and a cemented doublet L4, 304 and L5, 305 where L4 is a negatively powered element on the object side of the cemented doublet, and L5, is a positive powered element on the image side of the doublet. The effective focal length of the doublet is fd. The dn/dT values of the positive powered elements of Group 2, L3, 303 and L5, 305, are both negative. Group 3 comprises L6, 306, an aspherical element. The aspherical surfaces of L6, 306, in this preferred embodiment, are complex profiles with inflections points. The effective focal length of Group 3, 312 is f3. The flat filter 307 is an optional element.

The effective focal length of the entire lens assembly is f0. The values for the lens design parameters are included in table 6 below. Parameters include: the diameter of the image circle, IC, the clear aperture of the first lens, D1, and, the values for f0, f1, f2, f3 and fd. Calculated values showing that Conditions 1-6 are satisfied as shown in Table 7 below.

3.4 Embodiment 4

FIG. 4 illustrates a fourth embodiment. This design has a field angle of +/−86° with a relative aperture of F/2.4. Table 4A shows the optical prescription of Example 4. Table 4B shows the aspheric coefficients of Example 4.

TABLE 4A shows the optical prescription of Example 4.

| Surf | Type | Radius | Thickness | Nd | Vd | Conic | Comment |
|---|---|---|---|---|---|---|---|
| OBJ | STANDARD | Infinity | Infinity | | | 0 | |
| 1 | EVENASPH | 11.43118 | 0.7496944 | 1.497103, | 81.55958 | 0 | L1, 401 |
| 2 | EVENASPH | 1.859541 | 2.107257 | | | −0.6127859 | |
| 3 | EVENASPH | −5.726422 | 1.45078 | 1.634086, | 23.177698 | 0 | L2, 402 |
| 4 | EVENASPH | −5.1444 | −0.0337104 | | | 0 | |
| STO | STANDARD | Infinity | 0.1540693 | | | 0 | |
| 6 | STANDARD | 12.07121 | 2.057591 | 1.569070, | 71.306648 | 0 | L3, 403 |
| 7 | STANDARD | −3.277563 | 0.6212074 | | | 0 | |
| 8 | EVENASPH | 26.86238 | 0.4961095 | 1.634086, | 23.177698 | 0 | L4, 404 |
| 9 | EVENASPH | 3.062624 | 3.031569 | 1.536497, | 55.980688 | 0.02525233 | L5, 405 |
| 10 | EVENASPH | −3.560068 | 0.2854363 | | | 0 | |
| 11 | EVENASPH | 8.869586 | 0.9278943 | 1.634086, | 23.177698 | 0 | L6, 406 |
| 12 | EVENASPH | 3.445087 | 0.5 | | | 0 | |
| 13 | STANDARD | Infinity | 0.5 | 1.516797, | 64.212351 | 0 | Filter, 407 |
| 14 | STANDARD | Infinity | 1.359374 | | | 0 | |
| IMA | STANDARD | Infinity | | | | 0 | 408 |

TABLE 4B shows the aspheric coefficients of Example 4.

Surface 1 EVENASPH L1, 401

| Coefficient on $r^2$ : | 0 |
| Coefficient on $r^4$ : | 0.003370966 |
| Coefficient on $r^6$ : | 6.41E−05 |
| Coefficient on $r^8$ : | 0 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

Surface 2 EVENASPH

| Coefficient on $r^2$ : | 0 |
| Coefficient on $r^4$ : | 0.001128612 |
| Coefficient on $r^6$ : | 0.000439939 |
| Coefficient on $r^8$ : | 0 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

Surface 3 EVENASPH L2, 402

| Coefficient on $r^2$ : | 0 |
| Coefficient on $r^4$ : | 0.001001709 |
| Coefficient on $r^6$ : | 0.001126555 |
| Coefficient on $r^8$ : | 0 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

Surface 4 EVENASPH

| Coefficient on $r^2$ : | 0 |
| Coefficient on $r^4$ : | 0.009213857 |
| Coefficient on $r^6$ : | 0.00173125 |
| Coefficient on $r^8$ : | 0 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

Surface 8 EVENASPH L4, 404

| Coefficient on $r^2$ : | 0 |
| Coefficient on $r^4$ : | 0.002801077 |
| Coefficient on $r^6$ : | 0 |
| Coefficient on $r^8$ : | 0 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

Surface 9 EVENASPH L5, 405

| Coefficient on $r^2$ : | 0 |
| Coefficient on $r^4$ : | −0.002295228 |
| Coefficient on $r^6$ : | 0 |
| Coefficient on $r^8$ : | 0 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

Surface 10 EVENASPH

| Coefficient on $r^2$ : | 0 |
| Coefficient on $r^4$ : | 0.003538603 |
| Coefficient on $r^6$ : | 0.000487661 |
| Coefficient on $r^8$ : | 0 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

TABLE 4B-continued shows the aspheric coefficients of Example 4.

Surface 11 EVENASPH L6, 406

| Coefficient on $r^2$ : | 0 |
| Coefficient on $r^4$ : | −0.027668032 |
| Coefficient on $r^6$ : | 0.000705803 |
| Coefficient on $r^8$ : | 3.78E−05 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

Surface 12 EVENASPH

| Coefficient on $r^2$ : | 0 |
| Coefficient on $r^4$ : | 0.031066949 |
| Coefficient on $r^6$ : | 0.001629829 |
| Coefficient on $r^8$ : | −7.53E−05 |
| Coefficient on $r^{10}$ : | 0 |
| Coefficient on $r^{12}$ : | 0 |
| Coefficient on $r^{14}$ : | 0 |
| Coefficient on $r^{16}$ : | 0 |

The lens 400 is constructed as described in the brief summary above and comprises, from objective towards image or from left to right in FIG. 4, three lens groups, Group 1, 410, Group 2, 411 and Group 3, 412 all aligned along the optical axis 409. Group 1, 410 has negative refractive power and comprises negative power lens element L1, 401, having a concave image surface and meniscus shaped lens element L2, 402 where L2 is aspherical. Both surfaces of L2 are aspherical. The effective focal length of Group 1, 410 is f1, shown in table 5 below. Group 2, 411 has positive power and comprises positive powered L3, 403 and a cemented doublet L4, 404 and L5, 405 where L4 is a negatively powered element on the object side of the cemented doublet, and L5, is a positive powered element on the image side of the doublet. The effective focal length of the doublet is fd. The dn/dT values of the positive powered elements of Group 2, L3, 403 and L5, 405, are both negative. Group 3 comprises L6, 406, an aspherical element. The aspherical surfaces of L6, 406, in this preferred embodiment, are complex profiles with inflections points. The effective focal length of Group 3, 412 is f3. The flat filter 407 is an optional element.

The effective focal length of the entire lens assembly is f0. The values for the lens design parameters are included in table 6 below. Parameters include: the diameter of the image circle, IC, the clear aperture of the first lens, D1, and, the values for f0, f1, f2, f3 and fd. Calculated values showing that Conditions 1-6 are satisfied as shown in Table 7 below.

3.5 Embodiment 5

FIG. 5 illustrates a fifth embodiment. This design has a field angle of +/−88° with a relative aperture of F/2.2. Table 5A shows the optical prescription of Example 5. Table 5B shows the aspherical coefficients of Example 5.

TABLE 5A

| | | | shows the optical prescription of Example 5. | | | | |
|---|---|---|---|---|---|---|---|
| Surf | Type | Radius | Thickness | Nd | Vd | Conic | Comment |
| OBJ | STANDARD | Infinity | Infinity | | | 0 | |
| 1 | STANDARD | 41.335 | 1.216113 | 1.592824, | 68.62 | 0 | L1, 501 |
| 2 | STANDARD | 2.01146 | 2.429828 | | | 0 | |
| 3 | EVENASPH | −6.6181 | 1.774297 | 1.634086, | 23.18 | 0 | L2, 502 |
| 4 | EVENASPH | −5.6289 | −0.027811 | | | 0 | |
| STO | STANDARD | Infinity | 0.1277539 | | | 0 | |
| 6 | STANDARD | 15.7018 | 1.520931 | 1.592800, | 68.35 | 0 | L3, 503 |
| 7 | STANDARD | −3.2641 | 1.066483 | | | 0 | |
| 8 | EVENASPH | 12.4695 | 0.6091901 | 1.634086, | 23.18 | 0 | L4, 504 |
| 9 | STANDARD | 2.0734 | 3.132507 | 1.536497, | 55.98 | −0.77 | L5, 505 |
| 10 | EVENASPH | −4.3465 | 0.0977645 | | | 0 | |
| 11 | EVENASPH | 4.80699 | 0.5915575 | 1.634086, | 23.18 | 0 | L6, 506 |
| 12 | EVENASPH | 3.17841 | 0.95 | | | 0 | |
| 13 | STANDARD | Infinity | 0.5 | 1.516797, | 64.21 | 0 | Filter, 507 |
| 14 | STANDARD | Infinity | 0.8606114 | | | 0 | |
| IMA | STANDARD | Infinity | | | | 0 | 508 |

TABLE 5B shows the aspherical coefficients of Example 5.

Surface 3 EVENASPH L2, 502

| Coefficient on r^2 : | 0 |
|---|---|
| Coefficient on r^4 : | −0.00198 |
| Coefficient on r^6 : | 0.00069 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |

Surface 4 EVENASPH

| Coefficient on r^2 : | 0 |
|---|---|
| Coefficient on r^4 : | 0.007036 |
| Coefficient on r^6 : | 0.000945 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |

Surface STO STANDARD
Surface 6 STANDARD L3, 503
Surface 7 STANDARD
Surface 8 EVENASPH L4, 504

| Coefficient on r^2 : | 0 |
|---|---|
| Coefficient on r^4 : | 0.001328 |
| Coefficient on r^6 : | 0 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |

Surface 9 STANDARD L5, 505
Surface 10 EVENASPH

| Coefficient on r^2 : | 0 |
|---|---|
| Coefficient on r^4 : | 0.004353 |
| Coefficient on r^6 : | 2.55E−05 |
| Coefficient on r^8 : | 0 |
| Coefficient on r^10 : | 0 |
| Coefficient on r^12 : | 0 |
| Coefficient on r^14 : | 0 |
| Coefficient on r^16 : | 0 |

Surface 11 EVENASPH L6, 506

| Coefficient on r^2 : | 0 |
|---|---|
| Coefficient on r^4 : | −0.02431 |
| Coefficient on r^6 : | 0.000577 |
| Coefficient on r^8 : | 0 |
| Coefficient on r^10 : | 0 |
| Coefficient on r^12 : | 0 |

TABLE 5B-continued shows the aspherical coefficients of Example 5.

| Coefficient on r^14 : | 0 |
|---|---|
| Coefficient on r^16 : | 0 |

Surface 12 EVENASPH

| Coefficient on r^2 : | 0 |
|---|---|
| Coefficient on r^4 : | −0.03217 |
| Coefficient on r^6 : | 0.001406 |
| Coefficient on r^8 : | −4.72E−05 |
| Coefficient on r^10 : | 0 |
| Coefficient on r^12 : | 0 |
| Coefficient on r^14 : | 0 |
| Coefficient on r^16 : | 0 |

Group 1 comprises L1 and L2 where L2 is aspherical. Group 2 comprises L3, and a cemented doublet L4 and L5 where L4 is a negatively powered element. The dn/dT values of L3 and L5 are both negative. Group 3 comprises L6, an aspherical element. The flat filter is an optional element.

Conditions 1-6 are satisfied as shown in Table 5.

The lens 500 is constructed as described in the brief summary above and comprises, from objective towards image or from left to right in FIG. 5, three lens groups, Group 1, 510, Group 2, 511 and Group 3, 512 all aligned along the optical axis 509. Group 1, 510 has negative refractive power and comprises negative power lens element L1, 501, having a concave image surface and meniscus shaped lens element L2, 502 where L2 is aspherical. Both surfaces of L2 are aspherical. The effective focal length of Group 1, 510 is f1, shown in table 5 below. Group 2, 511 has positive power and comprises positive powered L3, 503 and a cemented doublet L4, 504 and L5, 505 where L4 is a negatively powered element on the object side of the cemented doublet, and L5, is a positive powered element on the image side of the doublet. The effective focal length of the doublet is fd. The dn/dT values of the positive powered elements of Group 2, L3, 503 and L5, 505, are both negative. Group 3 comprises L6, 506, an aspherical element. The aspherical surfaces of L6, 506, in this preferred embodiment, are complex profiles with inflections points. The effective focal length of Group 3, 512 is f3. The flat filter 507 is an optional element.

The effective focal length of the entire lens assembly is f0. The values for the lens design parameters are included in table 6 below. Parameters include: the diameter of the image circle, IC, the clear aperture of the first lens, D1, and, the values for f0, f1, f2, f3 and fd. Calculated values showing that Conditions 1-6 are satisfied as shown in Table 7 below.

4 Summary

The optical design for a compact wide-angle lens is shown. The design is compact in that that the ratio of the clear aperture of the first lens, nearest the object, to the image circle is less than 1.5. The design is applicable to lenses with a field of view greater than 90 degrees. Examples are shown with field angles from +/−45 degrees to +/−88 degrees. The designs are characterized by certain common design features in the lens elements used to construct the wide-angle lens and further characterized by a set of conditions, including for example the condition for the ratio of clear aperture (D) to image circle (IC). Table 6 summarizes various parameters of example 1 through 5. Table 7 shows that the conditions 1 to 6 are satisfied by those examples.

TABLE 6 summarizes various parameters of example 1 through 5:

|  | IC | D1 | f1 | f2 | fd | f3 | f0 |
|---|---|---|---|---|---|---|---|
| Example 1 (+/−45 deg) | 7.29 | 8.41 | −9.13 | 6.43 | 17.86 | −31.58 | 4.62 |
| Example 2 (+/−86 deg) | 6.24 | 8.1 | −8.38 | 4.66 | 9.87 | −20.69 | 2.75 |
| Example 3 (+/−86 deg) | 6.76 | 7.5 | −5.15 | 3.98 | 8.92 | −13.46 | 2.96 |
| Example 4 (+/−86 deg) | 6.6 | 6.77 | −6.3 | 3.91 | 6.95 | −9.45 | 2.84 |
| Example 5 (+/−88 deg) | 5.92 | 8.48 | −5.1 | 4.1 | 8.05 | −17.1 | 2.36 |

TABLE 7 shows that the conditions 1 to 6 are satisfied by those examples:

| EXAMPLE (field angle) | Condition 1 f1/ f0 | Condition 2 | Condition 3 | Condition 4 | Condition 5 | Condition 6 |
|---|---|---|---|---|---|---|
| Condition | f1/f0 ≤ −1.5 | 1.2 ≤ f2/f0 ≤ 1.8 | f3/f0 ≤ −3.0 | 1.5 ≤ fd/f2 ≤ 3.5 | 2.2 ≤ fd/f0 ≤ 5.5 | D1/IC ≤ 1.5 |
| Example 1 (+/−45 deg) | −1.98 | 1.39 | −6.84 | 2.78 | 3.87 | 1.15 |
| Example 2 (+/−86 deg) | −3.05 | 1.69 | −7.52 | 2.12 | 3.59 | 1.30 |
| Example 3 (+/−86 deg) | −1.74 | 1.34 | −4.55 | 2.24 | 3.01 | 1.11 |
| Example 4 (+/− 86 deg) | −2.22 | 1.38 | −3.33 | 1.78 | 2.45 | 1.03 |
| Example 5 (+/−88 deg) | −2.16 | 1.74 | −7.25 | 1.96 | 3.41 | 1.43 |

What is claimed:

1. A wide-angle lens assembly having a field of view of at least 90 degrees, an effective focal length of f0, and, the wide-angle lens assembly comprising from object to image:
   a. a first group having a negative refractive power and an effective focal length of f1, the first group comprising two lens elements: a first negative powered lens element having a convex object surface, a concave image surface and a clear aperture of the object side of D1, and a second lens element that has a meniscus shape with a concave object surface, a convex image surface and at least one of the two surfaces is aspherical, and,
   b. a second positive powered group having an effective focal length of f2 and comprising a first positive powered lens element and a positively powered cemented doublet with an effective focal length of fd, and,
   c. a third group having a focal length of f3, and, comprising an aspherical lens element with negative power.

2. The wide-angle lens assembly of claim 1 where a negative element of the cemented doublet faces the object side and where a positive element of the doublet faces the image side.

3. The wide-angle lens assembly of claim 1 the wide angle lens assembly forming an image circle having a diameter IC and the ratio D1/IC<1.5.

4. The wide-angle lens assembly of claim 1 where the positive elements in the second group have negative dn/dT values, where n is the refractive index of the lens material at d-line and T is the temperature.

5. The wide-angle lens assembly of claim 1 where the aspherical lens element of Group 3 is an aspherical lens element with inflection points.

6. The wide-angle lens assembly of claim 1 where the following conditions are satisfied:

a.
$$f1/f0 = \; < -1.5 \tag{1}$$

b.
$$1.2 = \; < f2/f0 = \; < 1.8 \tag{2}$$

c.
$$f3/f0 = \; < -3.0 \tag{3}$$

d.

-continued
$$1.5 = \; < fd/f2 = \; < 3.5 \tag{4}$$

e.
$$2.2 = \; < fd/f0 = \; < 5.5. \tag{5}$$

7. The wide-angle lens assembly of claim 2 where the following conditions are satisfied:

a.
$$f1/f0 = \; < -1.5 \tag{1}$$

b.
$$1.2 = \; < f2/f0 = \; < 1.8 \tag{2}$$

c.

-continued $$f3/f0 = < -3.0 \tag{3}$$

d.

$$1.5 = < fd/f2 = < 3.5 \tag{4}$$

e.

$$2.2 = < fd/f0 = < 5.5. \tag{5}$$

8. The wide-angle lens assembly of claim 1 where the following conditions are satisfied:

a.

$$f1/f0 < -2.0. \tag{1}$$

9. The wide-angle lens assembly of claim 1 where the following conditions are satisfied:

a.

$$1.5 < f2/f0 < 1.8. \tag{2}$$

10. The wide-angle lens assembly of claim 1 where the following conditions are satisfied:

a.

$$f3/f0 < -7.0. \tag{3}$$

11. The wide-angle lens assembly of claim 1 where the following conditions are satisfied:

a.

$$1.5 < fd/f2 < 2.0. \tag{4}$$

12. The wide-angle lens assembly of claim 1 where the following conditions are satisfied:

a.

$$3.5 < fd/f0 < 4.0. \tag{5}$$

13. The wide-angle lens assembly of claim 1 where the following conditions are satisfied:

a.

$$f1/f0 < -2.0 \tag{1}$$

b.

$$1.5 < f2/f0 < 1.8 \tag{2}$$

c.

$$f3/f0 < -7.0 \tag{3}$$

d.

$$1.8 < fd/f2 < 2.2 \tag{4}$$

e.

$$3.0 < fd/f0 < 4.0 \tag{5}$$

f.

$$1.2 < D1/IC < 1.5. \tag{6}$$

* * * * *